United States Patent [19]

Suzuki

[11] Patent Number: 4,597,731
[45] Date of Patent: Jul. 1, 1986

[54] FOOD SHAPING APPARATUS

[76] Inventor: Kisaku Suzuki, 1-19-8, Toshida, Nerima-ku, Tokyo, Japan

[21] Appl. No.: 717,422

[22] Filed: Mar. 29, 1985

[30] Foreign Application Priority Data

Apr. 4, 1984 [JP] Japan .................. 59-50252[U]

[51] Int. Cl.⁴ .............................. B29C 43/00
[52] U.S. Cl. .................. 425/204; 425/297; 425/307; 425/324.1; 425/403.1; 426/272; 426/512; 426/513
[58] Field of Search ........... 426/272, 512, 513; 425/204, 235, 297, 298, 307, 325, 403.1, 332, 324.1

[56] References Cited

U.S. PATENT DOCUMENTS

| | | | |
|---|---|---|---|
| 2,867,000 | 1/1959 | Huszar | 425/297 |
| 2,969,025 | 1/1961 | Schafer | 99/450.1 |
| 4,056,346 | 11/1977 | Hayashi | 425/297 |
| 4,334,464 | 6/1982 | Shinriki | 99/450.2 |
| 4,398,881 | 8/1983 | Kobayashi | 425/297 |

FOREIGN PATENT DOCUMENTS 45-21620 7/1970 Japan .

Primary Examiner—Willard E. Hoag
Attorney, Agent, or Firm—Jordan and Hamburg

[57] ABSTRACT

Rollers each having a plurality of radially extending vanes are arranged in pairs to define a downwardly extending path therebetween which progressively reduces in width from the top to the bottom, so that a material of a foodstuff is compressed while being fed downwardly by the roller pairs through the path. A horizontal conveyor belt lies below the path and is indexed to transfer a predetermined cut length of the material to a shaping station where the material is pushed up into a shaped cavity of a flexible cup member. The flexible cup member is embraced by presser members to shape the material under a preselected adjustable table pressure. The resulting block of material attains hardness and shape which would be provided by hand-shaping.

8 Claims, 7 Drawing Figures

FOOD SHAPING APPARATUS

BACKGROUND OF THE INVENTION

The present invention relates to an apparatus for shaping a material of a food into a specific shape and to hardness and taste which would be achievable with hand-shaping or hand-rolling. More particularly, the present invention relates to a mechanism for supplying a material of a food, which is to be provided with a desired shape, by each predetermined amount and after processing it to predetermined hardness.

Various foodstuffs are known which are prepared by handshaping predetermined amounts of boiled rice, meat or like material into desired shapes. Typical of such foodstuffs are sushi, hamburger steak and croquette. The process relying on manual work is not suitable for mass production due to the need for many workers and the poor yield. Nevertheless, there is a growing demand for such processed foods in parallel with the recent worldwide change of diet. This demand cannot be readily met, however, due to the ever increasing labor costs.

Sushi, for example, has come to win popularity especially in the dietary aspect. Sushi is a hand-rolled block of rice which should be constant both in amount and in shape. Hand-rolling, however, cannot avoid irregularity in shape or size or yield a large number of blocks at a time. Only the qualified persons with a long time of experience and skillful with their fingers can roll rice to a constant size at a commercially acceptable rate. Such persons are rare today and, if employed, would make the business ill-paid due to the prohibitive wages. Thus, mechanical means would prove quite convenient if realized to shape rice into blocks of sushi as hard and tasty as skillful hand-rolling. However, hardly any propositions have heretofore been made on such a type of food shaping apparatuses. A food shaping method is known which uses a mold of wood provided with recesses complementary in shape to blocks of sushi and prepares sushi by filling the recesses with rice and compressing it strongly from above. Yet, the resulting sushi is usually too hard and cannot attain the taste which is particular to hand-rolling. Should the compression force applied to the rice be cut down in order to adjust the hardness, the grains would fall off the resulting block putting the block out of shape.

In light of the above, I have already proposed an improved food shaping arrangement as disclosed in U.S. Pat. No. 4,460,611 issued July 17, 1984 and entitled "METHOD OF SHAPING FOOD". The disclosed arrangement is such that a material of a food is once loosened and scraped by a material feeding mechanism, then progressively compressed to a state easy to roll into a predetermined shape, and then transferred to a shaping mechanism to provide a foodstuff having a desired configuration. The material feeding mechanism comprises a plurality of plates located one behind the other and to face each other at a predetermined spacing, a plurality of pairs of rollers journalled to laterally opposite sides of the plates with a spacing which progressively decreases from a top pair down to a bottom pair, and a pair of feed belts for feeding downward the loosened and scraped material while being progressively compressed therebetween. The belts are passed over the rollers on the respective sides of the pairs and movable in opposite directions to each other. That is, the loosened and scraped material is compressed little by little while being guided by the belts before it is transferred to the shaping mechanism. The present invention constitutes an improvement over or a modification to such a material feeding mechanism in which the feed belts are omitted and, instead, a plurality of vanes are provided on the outer periphery of each of the rollers. The vanes are rotatable together with their associated rollers to progressively compress a material while guiding it.

SUMMARY OF THE INVENTION

It is an object of the present invention to provide a food shaping apparatus which can shape various foodstuffs as hard and tasty as those shaped by hand-shaping.

It is another object of the present invention to provide a food shaping apparatus which can shape a food constantly to predetermined dimensions and hardness and is clean and suitable for mass-production.

It is another object of the present invention to provide a food shaping apparatus which once loosens a material of a food and then progressively compresses it to promote ready shaping to a desired shape at the subsequent shaping station, while being capable of transferring the material to the shaping station a predetermined amount at a time despite a change in the hardness of the material.

It is another object of the present invention to provide a food shaping apparatus which prevents a block of material of a food from being broken or tilted on a conveyor belt.

It is another object of the present invention to provide a generally improved food shaping apparatus.

A food shaping apparatus for shaping a material of a food into a foodstuff of the present invention comprises a hopper for introducing the material thereinto, a conveyor for conveying the introduced material, looseners for loosening the material which is being conveyed by the conveyor, scrapers for scraping the loosened material, a casing for operatively supporting the conveyor, looseners and scrapers, the casing being at its top connected with a bottom of the hopper, a pair of plates located one behind the other and to face each other at a predetermined spacing, a plurality of pairs of rollers journalled to laterally opposite sides of the plates with a spacing which progressively decreases from a top pair of the rollers to a bottom pair, a plurality of vanes axially mounted on the periphery of each of the rollers, and a cutter located below the bottom pair of the rollers for cutting a predetermined amount or length of the material.

In accordance with the present invention, rollers each having a plurality of radially extending vanes are arranged in pairs to define a downwardly extending path therebetween which progressively reduces in width from the top to the bottom, so that a material of a foodstuff is compressed while being fed downwardly by the roller pairs through the path. A horizontal conveyor belt lies below the path and is indexed to transfer a predetermined cut length of the material to a shaping station where the material is pushed up into a shaped cavity of a flexible cup member. The flexible cup member is embraced by presser members to shape the material under a preselected pressure. The resulting block of material attains hardness and shape which would be provided by hand-shaping.

The above and other objects, features and advantages of the present invention will become apparent from the following detailed description taken with the accompanying drawings.

DESCRIPTION OF THE PREFERRED EMBODIMENT

While the food shaping apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
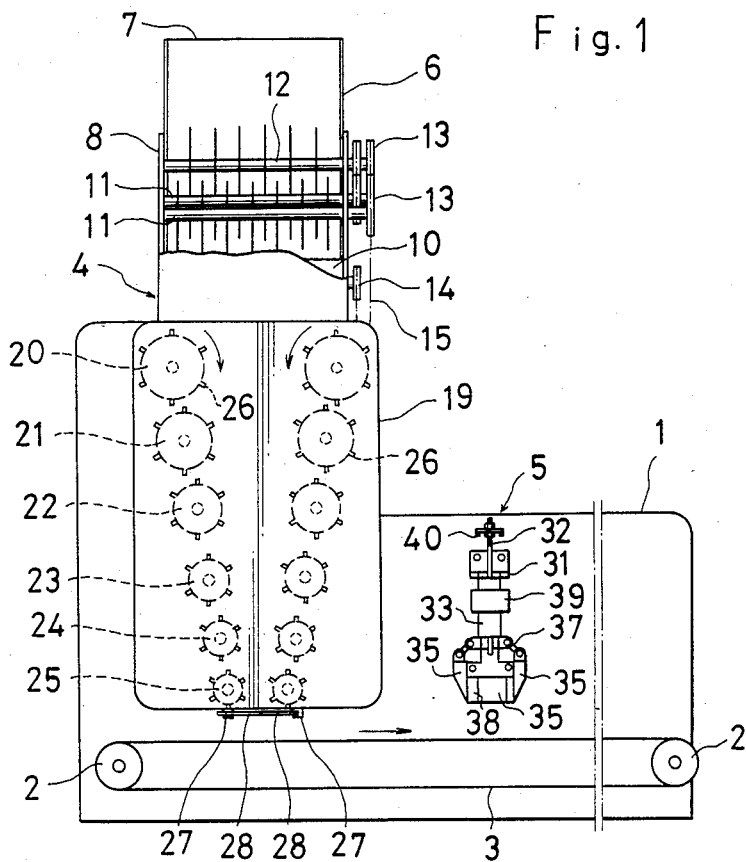
FIG. 1 is a front view of an overall arrangement of a food shaping apparatus in accordance with the present invention.
Figure 2:
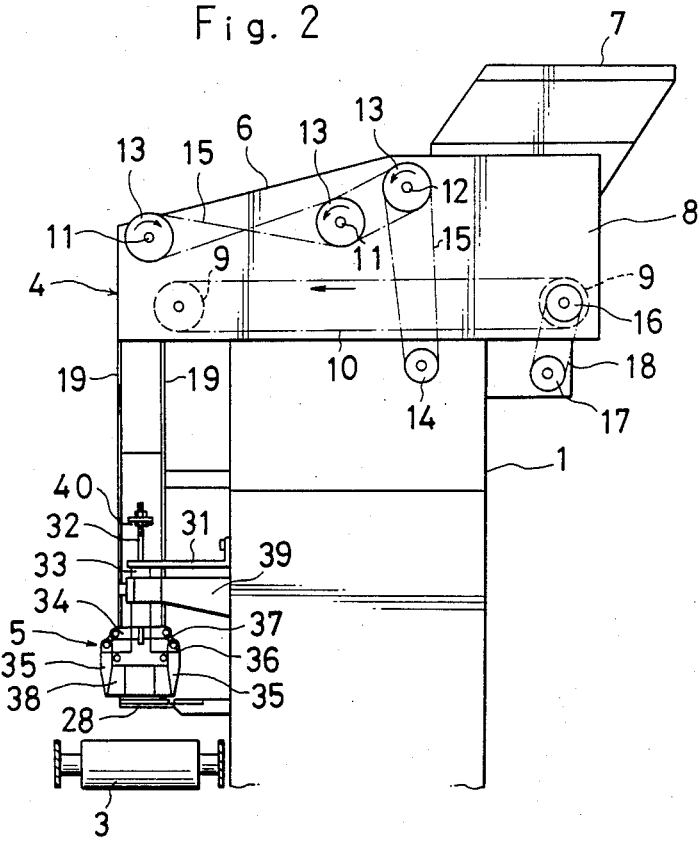
FIG. 2 is a side elevation of the apparatus shown in FIG. 1.

Referring to FIGS. 1-4, a food shaping apparatus embodying the present invention is shown and comprises a body, generally 1. The body 1 is provided with a flat and vertical front end. Rollers 2 and 2 are journalled to laterally opposite lower portions of the front end of the body 1. An endless conveyor belt 3 runs horizontally between the opposite rollers 2 and 2. Disposed above and at a spacing along the conveyor belt 3 are a material feeding mechanism and a shaping mechanism which are generally designated by the reference numerals 4 and 5, respectively. The feeding mechanism 4 includes an inlet section 6 in an upper portion thereof. As best shown in FIG. 2, the inlet section 6 adapted to introduce a material into the apparatus body 1 comprises a top-open casing 8 which is provided a hopper 7 in a rear portion thereof. Rollers 9 and 9 are journalled to the casing 8 adjacent to the inner bottom of the latter and at longitudinally spaced locations. A conveyor belt 10 is passed over the rollers 9 and 9. Three shafts 11, 11 and 12 are each journalled to opposite side walls of the casing 8 extending above and across the conveyor belt 10. A plurality of scraper bars (no numeral) are mounted on each of the shafts 11 and 11 at a predetermined spacing, as shown in FIG. 1. Likewise, a plurality of loosener bars (not numeral) are mounted on the shaft 12. Outside the casing 8, the shafts 11, 11 and 12 carry at their corresponding ends rope wheels 13, 13 and 13. Ropes 15, 15 and 15 run between the rope wheels 13, 13, 13 and another rope wheel 14 as shown, so that each of the rope wheels and, therefore, its associated shaft is rotatable as indicated by an arrow in FIG. 2.

One of the rollers 9 and 9 associated with the conveyor belt 10, on right as viewed in FIG. 2, carries a rope wheel 16 at one end thereof. A rope 18 is passed over the rope wheel 16 and another rope wheel 17 in order to drive the rope wheel 16 and, thereby, the belt 10 in a predetermined direction as indicated by an arrow through the roller 9.

Figure 4:
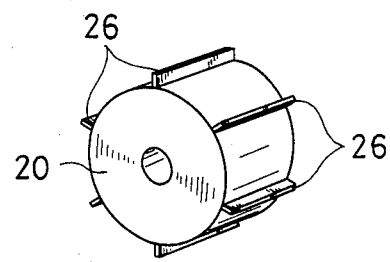
FIG. 4 is a perspective external view of one of feed rollers installed in the mechanism of FIG. 3.

A pair of longitudinally spaced parallel plates 19 and 19 are connected with the bottom of the casing 8 ahead of the other or front roller 9. Between the plates 19 and 19, there are arranged sequentially from top to bottom a plurality of pairs of feed rollers 20, 21, 22, 23, 24 and 25, the rollers in each pair being laterally spaced apart from each other. The roller-to-roller distance in the feed roller pairs progressively decreases from the top pair 20 toward the bottom pair 25. As best shown in FIG. 4, each of the rollers 20–25 is provided with a plurality of radially extending vanes 26 on its outer periphery.

Figure 3:
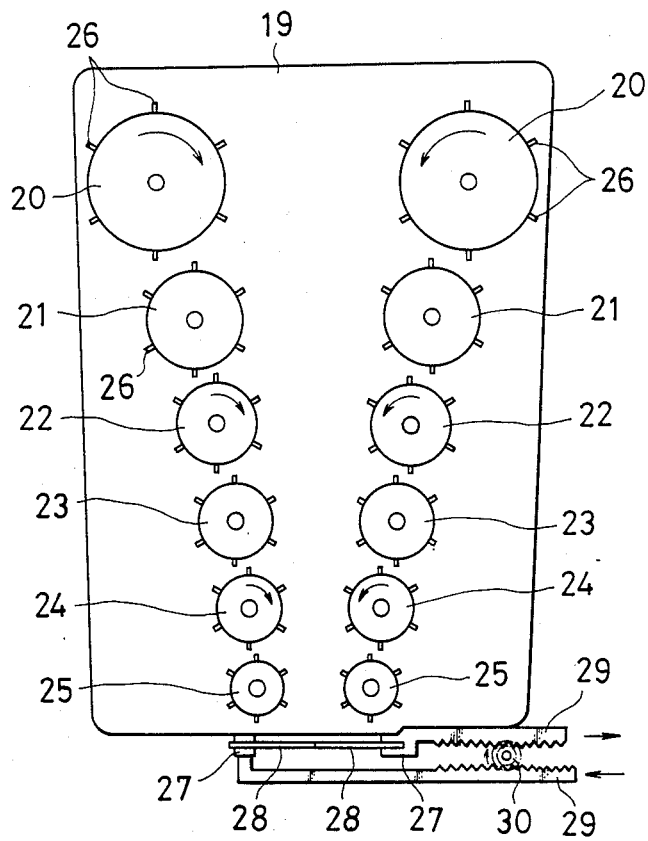
FIG. 3 is a front view of a material feeding mechanism included in the apparatus of FIG. 1.

Horizontally extending actuator arms 27 and 27 are located in the vicinity of the lower ends of the longitudinally spaced plates 19 and 19. Shutters 28 and 28 respectively are rigidly mounted on the free ends of the actuator arms 27 and 27 below the lowermost roller pair 25. The actuator arms 27 and 27 respectively are rigidly connected to two racks 29 and 29 which extend horizontally within the apparatus body 1. The racks 29 and 29 in turn are held in constant mesh with a pinion 30 from above and below (FIG. 3).

Meanwhile, the shaping mechanism 5 includes a frame member 31 protruding from the front end of the body 1, and a rod 32 extending vertically throughout the frame member 31. Although not shown in the drawings, the rod 32 carries a generally rectangular base plate rigidly at its lower end. A sleeve 33 is slidably coupled over the rod 32 while a return spring (not shown) is interposed between the sleeve 33 and the base plate. Ears 34 protrude radially outwardly from the lower end of the sleeve 33 into a cruciform shape. Presser members 35 are pivotally connected to the four sides of the base plate by pins 36. The ears 34 and the presser members 35 are interconnected in one to one correspondence by arms or links 37. Rigid on the underside of the base plate is a flexible cup member 38 made of rubber and provided with a downwardly open cavity (no numeral). An arm 39 is securely mounted on the sleeve 33 and movable up and down driven by a drive source (not shown). A stop 40 adapted to adjust the position of the rod 32 is securely engaged with the upper end of the rod 32.

In operation, when a control switch (not shown) of the apparatus is turned on, the rollers 2 and 2 are driven to move the conveyor belt 3 as indicated by an arrow. At the same time, the feed rollers 20–25 in the feeding mechanism 4 are driven as well as the rollers 9 and 9 in the inlet section 10, whereby the conveyor belt 10 is caused into movement as indicated by an arrow in FIG. 2. Further, due to rotation of the rope wheels 13 and 14, the scraper bar shafts 11 and 11 and the loosener bar shaft 12 are rotated in predetermined directions as illustrated.

In the above condition, a material (a) of an intended product such as boiled rice is introduced into the apparatus through the hopper 7. Then, the material (a) is loaded on the rear end of the conveyor belt 10 and entrained thereby progressively to the front in accordance with the movement of the belt 10. During the course of such movement, the material (a) is first agitated and loosened by the loosener bars on the shaft 12 which is rotating against the movement of the material (a), and then scraped out from the front end of the conveyor belt 10 by the scraper bars on the shafts 11 and 11 which are moving in the same direction as the material (a). The material (a) now drops into the path between the plates 19 and 19 by gravity to progressively accumulate itself between the opposite rollers 20–25. The resulting heap of material is moved downwardly along the direction of movement of the rollers 20–25. Specifically, the material (a) between the widely spaced uppermost rollers 20 is fed toward the lowermost rollers 25 through the progressively narrowing path defined between the successive intervening rollers 21, 22, 23 and 24, while being pushed downwardly by the vanes 26 provided on the respective rollers. Thereafter, at a predetermined timing, the pinion 30 is rotated to move the racks 29 and 29 in laterally opposite directions so that the actuator arms 27 and 27 are moved in the same direction to open the shutters 28 and 28. This causes the compressed material (a) to drop from between the lowermost feed rollers 25 and 25 toward the belt 3. At the next predetermined timing, the shutters 28 and 28 are closed again to cut a predetermined length of the material (a) from the heap.

Figure 5A:
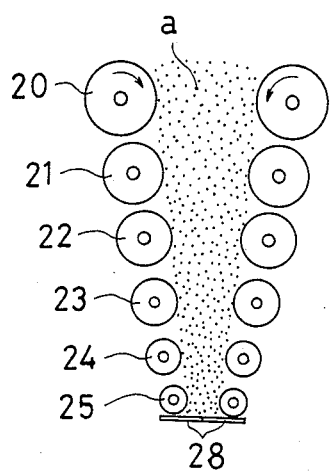
FIGS. 5A–5C are schematic views demonstrating the operation of the mechanism shown in FIG. 3.
Figure 5B:
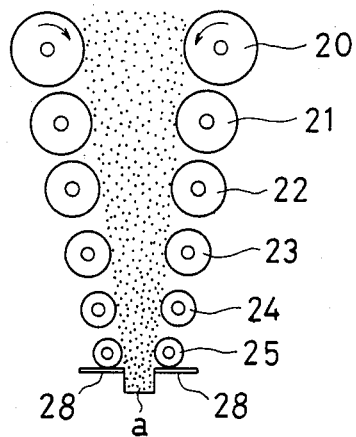
Figure 5C:
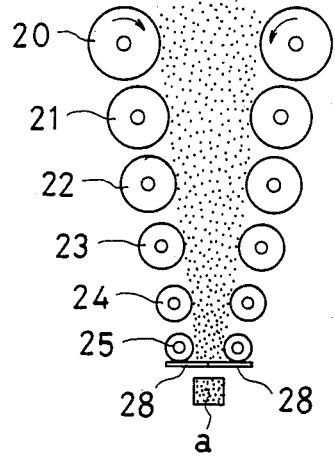

FIGS. 5A-5C illustrate the above procedure in detail. In the condition shown in FIG. 5A, although the shutters 28 and 28 are closed, the feed rollers 20-25 which are rotating force the dropped material (a) downwardly by means of their vanes 26 and, thereby, compress it to an adequate degree. Then, as shown in FIG. 5B, the shutters 28 and 28 are opened to allow the adequately compressed material (a) to be forced out downwardly through their gap. Finally, after a predetermined amount or length of material (a) has been forced out through the shutter gap, the shutters 28 and 28 are closed again to cut it from the rest while preventing the rest from dropping onto the belt 3. These consecutive steps of operation will be repeated thereafter.

The cut length of material (a) provided in the manner described above is laid on the conveyor belt 3 and, since the belt 3 is constantly indexed as indicated by an arrow in FIG. 1, transported thereby toward the shaping mechanism 5. As soon as the block (a) reaches a position beneath the mechanism 5, the arm 39 is lowered to move the rod 32, sleeve 33 and others downwardly toward the conveyor 3. At the instant when the molding 38 has made contact with the conveyor belt 3 and received the block (a) in its cavity, the stop 40 abuts against the frame member 31 preventing any further movement of the rod 32, but not that of the sleeve 33. The sleeve 33, therefore, slides downwardly along the outer periphery of the rod 32 against the action of the return spring so as to move the presser members 35 about the corresponding pins 36 through the links 37 until the presser members 35 pressingly engage with the outer surfaces of the flexible cup 38. The flexible cup 38 shapes the block of material (a) very softly as if hand-rolled, that is, mainly pressing the outside of the material only and under even pressure distribution throughout the block.

After the block (a) has been shaped or rolled over a predetermined period of time, the arm 39 is raised to move the stop 40 clear of the frame member 31 and expand the return spring. As a result, the presser members 35 are caused to swing outwardly to release the material (a) from the cavity of the flexible cup 38. The material (a) now in a complete shape is transported by the conveyor belt 3 to a position just below the shaping mechanism 5.

In summary, it will be seen that the present invention provides a food shaping apparatus which can supply a material of a desired food in a compressed condition for easy shaping into a particular configuration and, yet, without kneading the material and can smoothly and positively transfer the material by each predetermined amount to the subsequent shaping stage. These advantages are derived from a unique construction in which a plurality of pairs of laterally spaced feed rollers are arranged vertically and below a material inlet section, each of the feed rollers is provided with a plurality of radially extending vanes, the roller-to-roller distance is sequentially reduced from the top pair toward the bottom pair, and shutters are disposed below the bottom pair.

Various modifications will become possible for those skilled in the art after receiving the teachings of the present disclosure without departing from the scope thereof.

What is claimed is:

1. A food shaping apparatus for shaping a material of a food into a foodstuff, comprising:
    a hopper for introducing said material thereinto;
    conveyor means for conveying said introduced material;
    loosener means for loosening the material which is being conveyed by said conveyor means;
    scraper means for scraping the loosened material;
    a casing for operatively supporting the conveyor means, loosener means and scraper means, said casing being at its top connected with a bottom of the hopper;
    a pair of plates located one behind the other and to face each other at a predetermined spacing;
    a plurality of pairs of rollers journalled to laterally opposite sides of said plates with a spacing which progressively decreases from a top pair down to a bottom pair;
    a plurality of vanes axially mounted on the periphery of each of said rollers; and
    cutter means located below said bottom pair of the rollers for cutting a predetermined amount or length of the material.

2. A food shaping apparatus as claimed in claim 1, wherein said conveyor means comprises a pair of rollers and a conveyor belt which is horizontally passed over the rollers.

3. A food shaping apparatus as claimed in claim 1, wherein said loosener means comprises a shaft rotatably supported by the casing and a plurality of bars mounted on the shaft.

4. A food shaping apparatus as claimed in claim 1, wherein the scraper means comprises a shaft rotatably supported by the casing and a plurality of bars mounted on the shaft.

5. A food shaping apparatus as claimed in claim 1, wherein the cutter means comprises shutters movable toward and away from each other in the lateral direction.

6. A food shaping apparatus as claimed in claim 1, further comprising feeding means comprising a horizontal conveyor belt for feeding the cut length of the material intermittently.

7. A food shaping apparatus as claimed in claim 6, further comprising a flexible cup member formed of resilient material and provided with a cavity which is open at one end thereof for receiving the cut length of the material therein, and presser means located outside of the flexible cup member for pressing the cut length of the material through the flexible cup member to shape the foodstuff.

8. A food shaping apparatus as claimed in claim 1, wherein the material comprises boiled rice.

* * * * *